United States Patent
Engert et al.

(10) Patent No.: US 7,907,396 B2
(45) Date of Patent: Mar. 15, 2011

(54) SYSTEM UNIT OF A COMPUTER

(75) Inventors: Stefan Engert, Fürth (DE); Klaus Hertlein, Langenzenn (DE); Rainer Hölle, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 43 days.

(21) Appl. No.: 12/383,983

(22) Filed: Mar. 31, 2009

(65) Prior Publication Data

US 2009/0244828 A1   Oct. 1, 2009

(30) Foreign Application Priority Data

Mar. 31, 2008   (DE) .......................... 10 2008 016 444

(51) Int. Cl.
*G06F 1/20* (2006.01)
*H05K 7/20* (2006.01)

(52) U.S. Cl. ........... 361/679.49; 361/679.48; 361/679.5; 361/695; 361/697; 361/704; 361/709; 361/719; 165/80.3; 165/185

(58) Field of Classification Search ......... 361/679.46–679.51, 679.54, 690, 361/692, 694–697, 702, 704, 709, 719–720; 165/80.2–80.5, 185, 908; 174/16.1, 16.3; 454/184

See application file for complete search history.

(56) References Cited

U.S. PATENT DOCUMENTS

| | | | | |
|---|---|---|---|---|
| 4,674,004 A | | 6/1987 | Smith et al. | |
| 5,563,768 A | * | 10/1996 | Perdue | 361/695 |
| 5,583,316 A | * | 12/1996 | Kitahara et al. | 174/16.3 |
| 5,810,072 A | * | 9/1998 | Rees et al. | 165/80.3 |
| 5,940,266 A | | 8/1999 | Hamilton et al. | |
| 6,400,568 B1 | * | 6/2002 | Kim et al. | 361/697 |
| 6,501,651 B2 | * | 12/2002 | Lin et al. | 361/697 |
| 6,765,796 B2 | * | 7/2004 | Hoffman et al. | 361/695 |
| 6,842,340 B2 | * | 1/2005 | Chang | 361/695 |
| 7,027,300 B2 | * | 4/2006 | Lord | 361/695 |
| 7,611,402 B2 | * | 11/2009 | McClellan et al. | 454/184 |
| 2009/0231813 A1 | * | 9/2009 | Busch et al. | 361/702 |

FOREIGN PATENT DOCUMENTS

DE   102005009076 A1   9/2006

OTHER PUBLICATIONS

Siemens Catalog "pc bas Automation, Embedded Automation und PC-based Automation", ST PC Edition, 2007, pp. 3/1 to 3/11.

* cited by examiner

*Primary Examiner* — Robert J Hoffberg

(57) ABSTRACT

The invention relates to a system unit of a computer. The system unit has a plug-in card populated with components and a fan which supplies an air flow to an air ducting body arranged in the system unit. The air flow is provided for cooling the plug-in card which is arranged in the system unit essentially parallel to the air ducting body. Cooling of the plug-in card is improved in that the air ducting body has a central conduit and a first and a second side conduit. The side conduits are provided with a plurality of openings which are arranged in a row and aligned essentially parallel to heat sinks arranged on the plug-in card. The central conduit has a constriction for the admission of air.

5 Claims, 3 Drawing Sheets

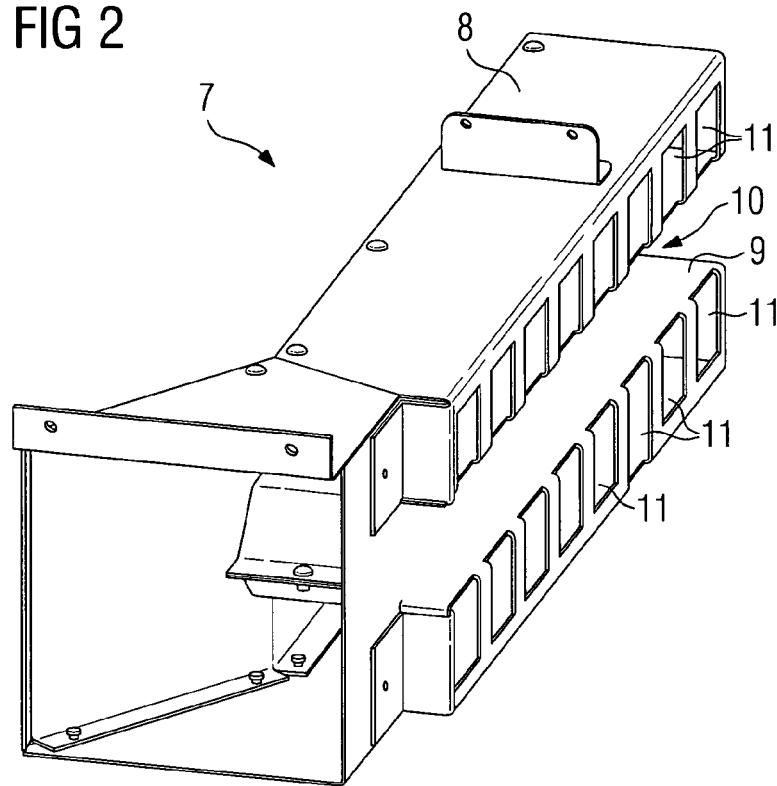
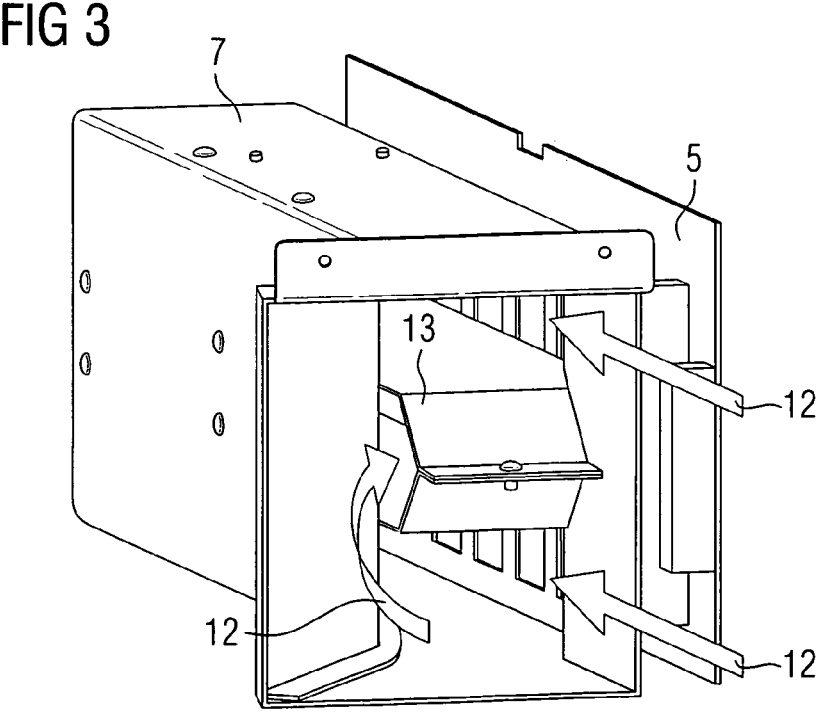

SYSTEM UNIT OF A COMPUTER

CROSS REFERENCE TO RELATED APPLICATIONS

This application claims priority of German application No. 10 2008 016 444.5 filed Mar. 31, 2008, which is incorporated by reference herein in its entirety.

FIELD OF THE INVENTION

The invention relates to a system unit of a computer.

BACKGROUND OF THE INVENTION

A system unit of said kind is known from the Siemens ST PC Catalog, Edition 2007, pages 3/2 to 3/11. An operator input unit, e.g. an operator input unit in the form of a keyboard and/or a mouse, as well as at least one image reproducing device and other hardware units can be connected to said system unit. Moreover, said system unit is provided with further PCI plug-in cards which are suitable for operation of the computer and can be plugged into slots of what is referred to as a motherboard, as well as with other hardware means, an air flow generated by means of a fan being provided for dissipating heat from the plug-in cards.

A plug-in card is commonly installed in a system unit of said kind, in particular in the context of an image processing application in the medical field. The plug-in card is provided with up to sixteen processors, thereby enabling images captured in real time by an image sensor to be processed and displayed on a display unit. This requires very high levels of computing power, which means that the high thermal leakage power generated during the operation of said sixteen processors has to be dissipated.

A cooling air ducting arrangement which is provided for cooling components of a plug-in card is known from U.S. Pat. No. 5,940,266.

U.S. Pat. No. 4,674,004 discloses a cooling system for cooling printed circuit boards or cards wherein each printed circuit board or card has its own ducting structure.

SUMMARY OF THE INVENTION

The object underlying the present invention is to provide a system unit of a computer by which cooling of a plug-in card arranged in the system unit is improved.

The system unit has a plug-in card populated with components and a fan which supplies an air flow to an air ducting body arranged in the system unit. The air flow is provided for cooling the plug-in card which is arranged in the system unit essentially parallel to the air ducting body.

This object is achieved in that the air ducting body has a central conduit and a first and a second side conduit, the side conduits being provided with a plurality of openings arranged in a row and aligned essentially parallel to heat sinks arranged on the plug-in card, with the central conduit having a constriction for the admission of air.

It is advantageous that the plug-in card can be provided with a plurality of processors or other processing units having high levels of computing power; it is ensured that the thermal leakage power generated during operation is dissipated. The cold air flow generated by the fan in the first and the second side conduit cools the heat sinks of the plug-in card. In addition, the constriction for the admission of air results on the one hand in a negative pressure being produced in the central conduit and on the other hand in an increase in the flow velocity of the air stream in the central conduit. This causes the warm air given off by the heat sinks to be sucked into the central conduit and dissipated through the central conduit.

In an embodiment of the invention it is provided that the central conduit is formed by side walls of the first and the second side conduit, which means a saving of material.

BRIEF DESCRIPTION OF THE DRAWINGS

The invention, its embodiments and advantages are explained in more detail below with reference to the drawing, in which an exemplary embodiment of the invention is illustrated.

FIG. 2 shows a perspective representation of the air ducting body according to FIG. 1, and FIGS. 3 and 4 show a perspective representation of the air ducting body and the plug-in card according to FIG. 1.

The same parts in FIGS. 1 to 4 are labeled with the same reference signs.

DETAILED DESCRIPTION OF THE INVENTION

Figure 1:
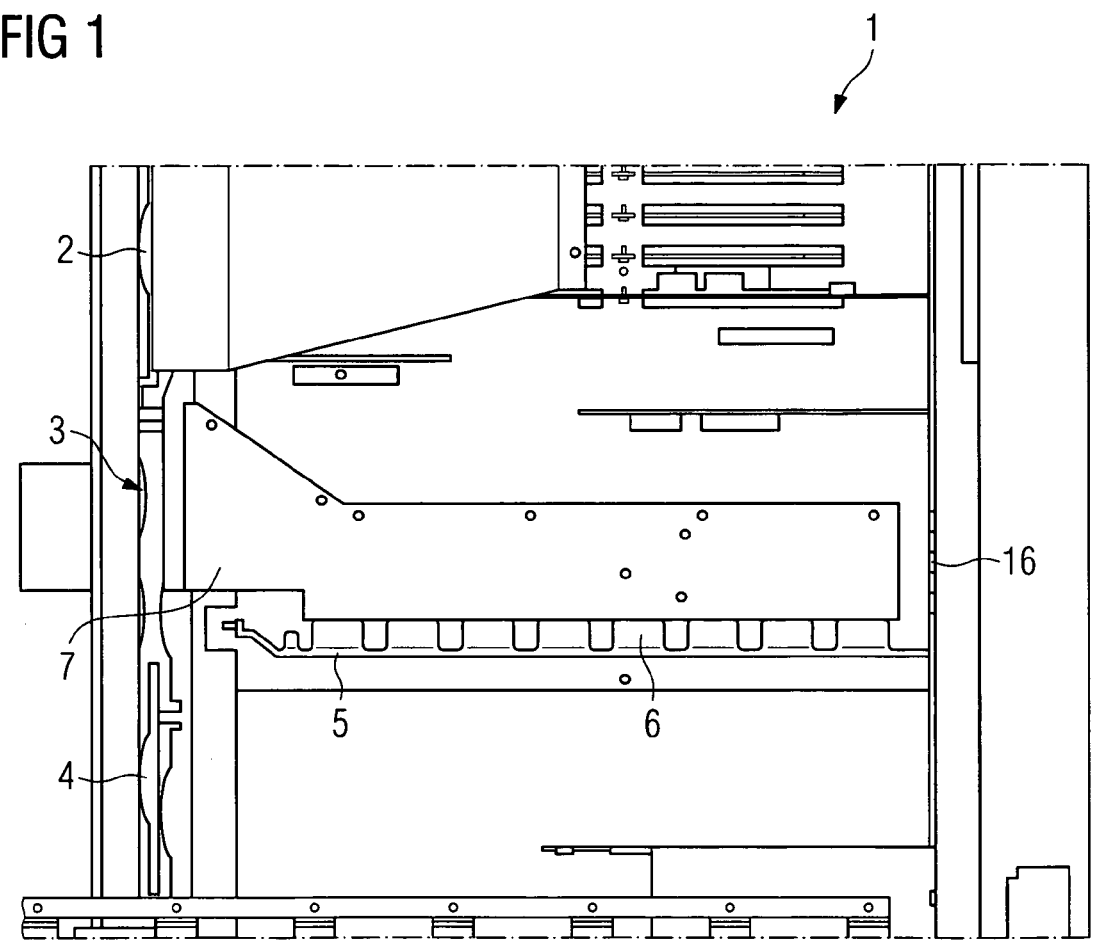
FIG. 1 shows a system unit having an air ducting body and a plug-in card in a plan view.

In FIG. 1, a system unit of an image processing computer is designated by 1, said system unit 1 having a fan unit which is provided with three fans 2, 3, 4. Operator input units, e.g. operator input units in the form of a keyboard and/or a mouse, as well as at least one image reproducing device and further hardware units can be connected to said system unit 1. The system unit 1 is additionally provided with what is termed a PCI plug-in card 5 which is populated with processors and further components and which is plugged into a slot of a motherboard (not shown here). For reasons of greater clarity, only one PCI plug-in card is shown in the illustrated exemplary embodiment. It goes without saying that the motherboard has further slots for accommodating further plug-in cards, e.g. plug-in cards for implementing Ethernet or field bus communication. Further component parts of the system unit 1, such as, for example, floppy disk or hard disk drives, power supply unit or other hardware means suitable for the operation of the computer, are of no relevance as far as the invention is concerned and consequently are not explained. The PCI plug-in card 5 has a plurality of heat sinks 6 which are arranged in two opposing rows and which—as will be shown in the following—are oriented toward openings of a first and a second side conduit of an air ducting body 7.

Figure 4:
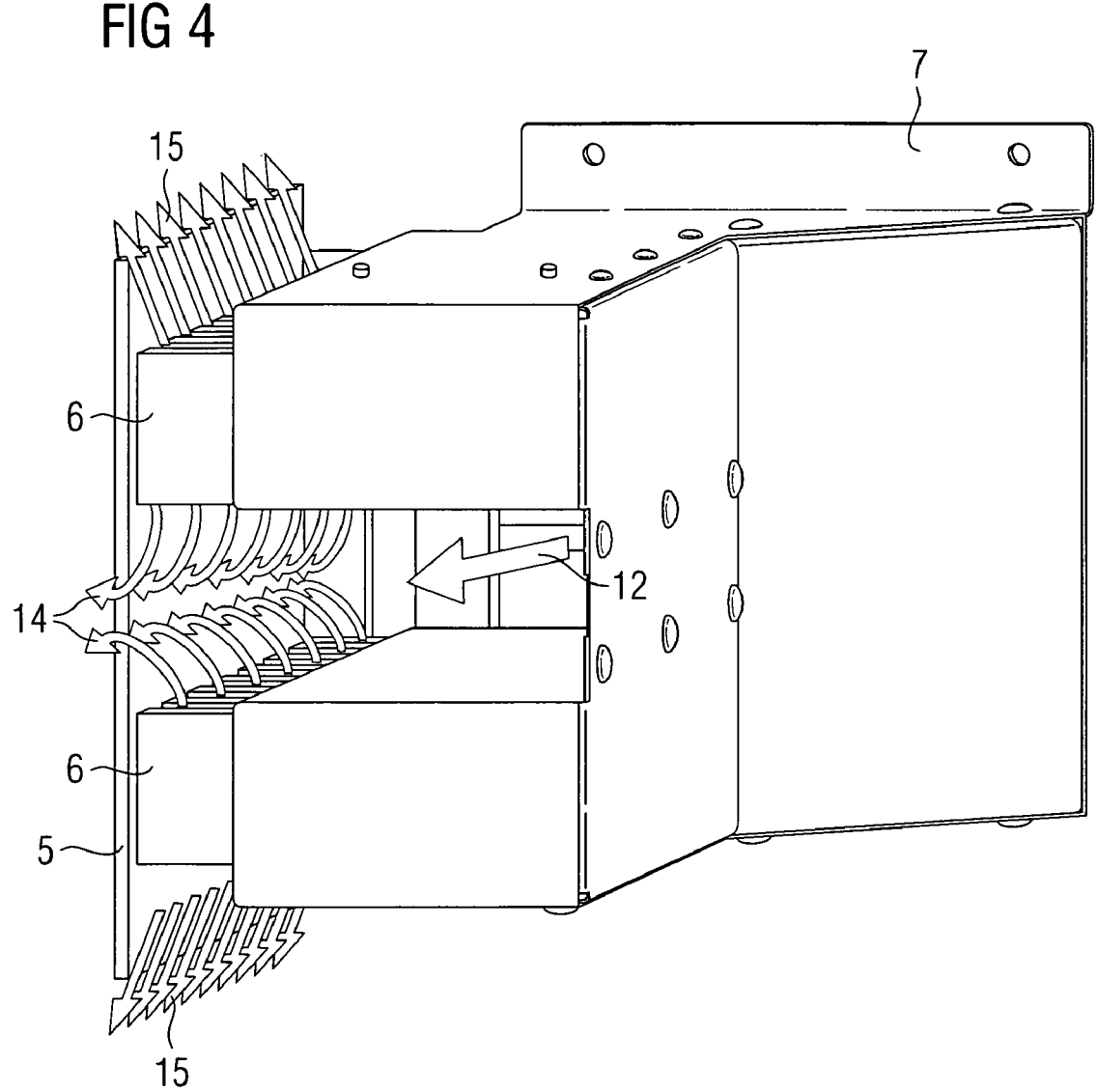

Reference is made in this connection to FIGS. 2 to 4, in which the air ducting body 7 and the air ducting body 7 having the PCI plug-in card 5 are respectively represented in perspective views. The air ducting body 7 has a first and a second side conduit 8, 9 as well as a central conduit 10 formed by means of side walls of the side conduits 8, 9. Cold air of an air flow 12 (FIGS. 3 and 4) generated by means of the fan 3 (FIG. 1) is directed through openings 11 in the side conduits 8, 9 to the heat sinks 6 of the plug-in card 5, while at the same time cold air of said air flow 12 is also supplied by way of a constriction 13 to the central conduit 10. As a result of the constriction 13 for the admission of air into the central conduit 10 a negative pressure is produced in the central conduit 10, thus causing a part 14 of the warm air given off by the heat sinks 6 to flow into the central conduit 10. Furthermore, the constriction 13 causes an increase in the flow velocity of the air flow 12 in the central conduit, as a result of which the part 14 of the warm air 14, 15 is dissipated in the direction of the air outlet openings 16 of the system unit 1 (FIG. 1). In other words, the heat or, as the case may be, thermal leakage power generated by electronic components of the plug-in card 5 during operation is guided over the heat sinks 6 and the part 14 of the warm air 14, 15 given off by the heat sinks 6 is finally dissipated owing to the cold air flow 12 and the constriction 13 in the central conduit 10 in the direction of the air outlet openings 16 (FIG. 1) of the system unit 1.

The invention claimed is:

1. A system unit of a computer, comprising:
 a plug-in card;
 a first row of heat sinks and a second row of heat sinks arranged on the plug-in card;
 an air ducting body comprising:
 a central conduit that comprises a constriction,
 a first side conduit and a second side conduit, each of the first side conduit and the second side conduct comprising a plurality of openings, wherein each of the plurality of openings are arranged in a row and aligned parallel to a respective row of the first row of heat sinks and the second row of heat sinks; and
 a fan arranged opposite to air outlet openings and supplying an air flow to the air ducting body for cooling the plug-in card,
 wherein a mounting surface of the plug-in card for the first row of heat sinks and the second row of heat sinks is parallel to the each of the plurality of openings of the air ducting body,
 wherein the air flow is admitted by the constriction of the central conduit into the central conduit,
 wherein the constriction is configured to produce a negative pressure in the central conduit so that part of warm air generated by the first row of heat sinks and the second row of heat sinks flows into the central conduit, and
 wherein the constriction is configured to increase a flow velocity of the air flow in the central conduit.

2. The system unit as claimed in claim 1, wherein the central conduit is formed by a first side wall of the first side conduit and a second side wall of the second side conduit.

3. The system unit as claimed in claim 1, wherein the plug-in card comprises a processor.

4. The system unit as claimed in claim 1, wherein the computer is an image processing computer.

5. A method for cooling a plug-in card of a system unit of a computer, comprising:
 arranging a first row of heat sinks and a second row of heat sinks on the plug-in card;
 arranging an air ducting body in the system unit, the air ducting body comprising:
 a central conduit that comprises a constriction,
 a first side conduit and a second side conduit, each of the first side conduit and the second side conduct comprising a plurality of openings, wherein each of the plurality of openings are arranged in a row and aligned parallel to a respective row of the first row of heat sinks and the second row of heat sinks; and
 providing a fan arranged opposite to air outlet openings and supplying an air flow to the air ducting body for cooling the plug-in card,
 wherein a mounting surface of the plug-in card for the first row of heat sinks and the second row of heat sinks is parallel to the each of the plurality of openings of the air ducting body,
 wherein the air flow is admitted by the constriction of the central conduit into the central conduit,
 wherein the constriction is configured to produce a negative pressure in the central conduit so that part of warm air generated by the first row of heat sinks and the second row of heat sinks flows into the central conduit, and
 wherein the constriction is configured to increase a flow velocity of the air flow in the central conduit.

* * * * *